United States Patent
Cheng et al.

(10) Patent No.: US 7,367,491 B2
(45) Date of Patent: May 6, 2008

(54) SYSTEM AND METHOD FOR DYNAMICALLY CONTROLLING ATTENDANCE OF A GROUP OF EMPLOYEES

(75) Inventors: Kung Chieh Cheng, Santa Clara, CA (US); Po Hsuan Wu, Tu-Chen (TW)

(73) Assignee: Hon Hai Precison Industry Co., Ltd., Tu-Cheng, Taipei Hsien (TW)

( * ) Notice: Subject to any disclaimer, the term of this patent is extended or adjusted under 35 U.S.C. 154(b) by 515 days.

(21) Appl. No.: 10/912,856

(22) Filed: Aug. 6, 2004

(65) Prior Publication Data
US 2005/0033670 A1 Feb. 10, 2005

(30) Foreign Application Priority Data
Aug. 6, 2003 (TW) .............................. 92121567 A

(51) Int. Cl.
*G06F 7/00* (2006.01)
(52) U.S. Cl. .................. 235/376; 235/375; 705/8; 705/9; 705/32
(58) Field of Classification Search .............. 235/376, 235/377, 487, 486; 705/8–9, 32
See application file for complete search history.

(56) References Cited

U.S. PATENT DOCUMENTS

| | | | | |
|---|---|---|---|---|
| 5,842,182 | A * | 11/1998 | Bonner et al. ............... | 705/32 |
| 6,173,153 | B1 | 1/2001 | Bittman | |
| 7,229,013 | B2 * | 6/2007 | Ben-Aissa .................. | 235/380 |
| 7,233,919 | B1 * | 6/2007 | Braberg et al. ............... | 705/32 |
| 2002/0030582 | A1 * | 3/2002 | Depp et al. ................ | 340/5.53 |
| 2002/0198758 | A1 * | 12/2002 | Sawa et al. .................... | 705/9 |
| 2003/0023580 | A1 * | 1/2003 | Braud et al. .................. | 707/3 |
| 2003/0033167 | A1 * | 2/2003 | Arroyo et al. ................ | 705/1 |
| 2003/0046135 | A1 * | 3/2003 | Cartwright et al. ............ | 705/8 |
| 2003/0078798 | A1 * | 4/2003 | Zaks et al. ..................... | 705/1 |
| 2004/0019542 | A1 * | 1/2004 | Fuchs et al. .................. | 705/32 |
| 2005/0149371 | A1 * | 7/2005 | Wang et al. ................... | 705/8 |
| 2006/0010051 | A1 * | 1/2006 | Sattler et al. ................. | 705/32 |
| 2006/0095315 | A1 * | 5/2006 | Ano et al. ..................... | 705/11 |
| 2006/0284838 | A1 * | 12/2006 | Tsatalos et al. ............. | 345/156 |
| 2007/0094109 | A1 * | 4/2007 | Perry ........................... | 705/32 |

FOREIGN PATENT DOCUMENTS

| | | |
|---|---|---|
| JP | 2000-311264 A | 11/2000 |
| TW | 459190 | 10/2001 |
| TW | 517194 | 1/2003 |
| TW | 533365 | 5/2003 |

* cited by examiner

*Primary Examiner*—Thien M. Le
*Assistant Examiner*—Edwyn Labaze
(74) *Attorney, Agent, or Firm*—Wei Te Chung

(57) ABSTRACT

A system for dynamically controlling attendance of a group of employees includes a corporation website (12), an application server (13), a database (15), and a number of client computers (10). The application server includes an attendance management module (131) for performing operations of recording an arrival time, a departure time and a work place of each employee, calculating actual work hours according to the arrival time and departure time, comparing the actual work hours to normal work hours specified in corresponding attendance requirements, and processing abnormal attendance statuses. A related method for dynamically controlling attendance of a group of employees is also disclosed.

10 Claims, 4 Drawing Sheets

SYSTEM AND METHOD FOR DYNAMICALLY CONTROLLING ATTENDANCE OF A GROUP OF EMPLOYEES

BACKGROUND OF THE INVENTION

1. Field of the Invention

The present invention relates to systems and methods for human resource management, and especially to a system and method for recording attendance information on employees at their places of work.

2. Background of the Invention

The most common conventional system for recording attendance information on employees uses time cards. Each employee has a time card, which he/she inserts into a "clocking-in" apparatus when he/she arrives at work. The apparatus stamps the time of insertion on the card. The card is also inserted when the person leaves work, so that the hours worked by that person can be calculated according to the times stamped on the card. The system may also be expanded to record information about the times of attendance of all the employees. This record may be in the form of a punched tape or a magnetic tape. The time of arrival of each employee, together with information that identifies the employee, is recorded. At a later stage, the tape may be removed from the system equipment and processed through a computer, so that the number of hours worked by each employee may be assessed. This enables the wages of the employees to be determined.

The operation of such equipment is rather inconvenient and time consuming. If information relating to the time worked by each employee is readily ascertainable from the time cards, any person may easily obtain this information and compromise confidentiality. If the information is stored on tape or similar means, the tape can only be processed after its removal from the system equipment and its insertion into a computer. There is a delay between the recording of the information and the processing of the information relating to the employee. Furthermore, it is necessary to not only have a system for recording the times of attendance of the employees, but also a separate system/computer for processing such information. Moreover, in order for each employee to calculate his/her own hours worked in a given period, he/she must manually perform calculations based on the times stamped on his/her card.

At present, the art of computerized recording of attendance information on employees is disclosed in patents such as U.S. Pat. No. 5,266,780 issued on Nov. 30, 1993 and entitled Human Error Preventing System Using Bar Code Reading Collations. This patent discloses a human error preventing system. The system uses a bar code reader to read attendance information, and necessarily requires the user to operate the bar code reader by passing the reader over the bar-coded information. Again, this process is unduly cumbersome and slow, because the user has to hold and operate the reader.

SUMMARY OF THE INVENTION

A main objective of the present invention is to provide a system and method for dynamically controlling attendance of a group of employees, which is not only able to record the attendance of the employees, but is also able to process any abnormal attendance statuses that occur.

To accomplish the above objective, a system for dynamically controlling attendance of a group of employees in accordance with a preferred embodiment of the present invention comprises a corporation website, an application server, a database, and a plurality of client computers. The application server comprises: a master data management module for maintaining master data on employees in an organization; an attendance management module for performing operations of recording an arrival time, a departure time and a work place of each employee, calculating actual work hours according to the arrival time and departure time for each employee, comparing the actual work hours to normal work hours specified in attendance requirements of the employee, and processing abnormal attendance statuses; an information inquiry and analysis module for users to search for attendance records related to any one or all of the employees; and a report management module for generating reports.

The present invention also provides a method for dynamically controlling attendance of a group of employees, the method comprising the steps of: (1) storing master data on the group of employees in a database; (2) recording an arrival time, a departure time and a work place of each employee, and generating a current attendance record for the employee; (3) comparing the current attendance record to attendance requirements specified for the employee; (4) determining whether there is a completed application form for explaining an abnormality if the current attendance record does not match with the attendance requirements; (5) transmitting an e-mail to a corresponding supervisor notifying him/her of the need to verify the completed application form if there is such a completed application form; (6) transmitting an e-mail to the employee notifying him/her of the need to fill out an application form if there is no completed application form; and (7) generating reports.

Other objects, advantages and novel features of the present invention will be drawn from the following detailed description of the preferred embodiment and a preferred method together with the attached drawings, in which:

DETAILED DESCRIPTION OF THE INVENTION

Figure 1:
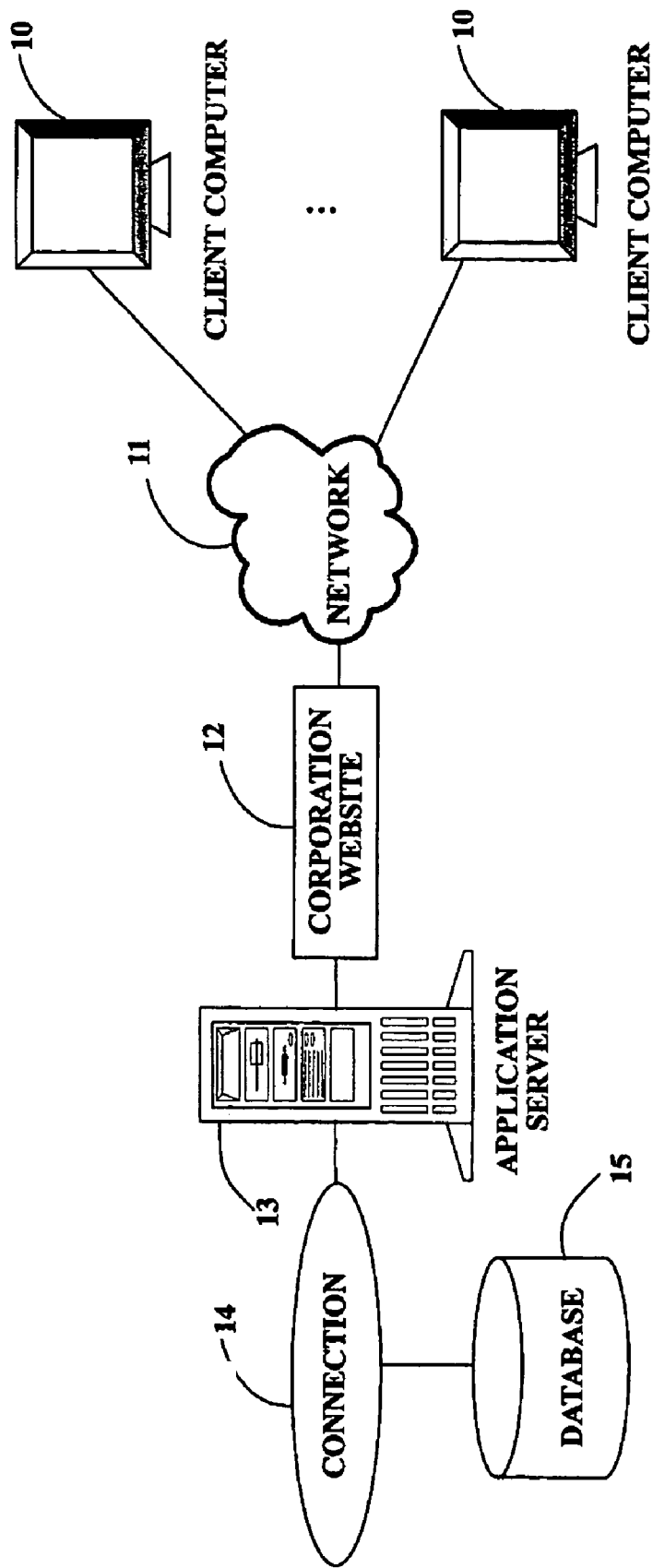
FIG. 1 is a schematic diagram of hardware configuration of a system for dynamically controlling attendance of a group of employees in accordance with the preferred embodiment of the present invention.

FIG. 1 is a schematic diagram of hardware configuration of a system for dynamically controlling attendance of a group of employees of an organization (hereinafter, "the system") in accordance with the preferred embodiment of the present invention. The system comprises a plurality of client computers 10, a corporation website 12, an application server 13, and a database 15. Each client computer 10 provides an interactive user interface for any of the employees to log on the corporation website 12 in order to process attendance operations. The attendance operations include recording an arrival time and a departure time of each employee. At the beginning of each work shift, the employees register their arrival times; and at the end of the work shift, the employees register their departure times. This enables calculation of the employees' respective work hours. The client computers 10 may also enable a qualified supervisor to obtain information relating to any of the employees, and to alter the obtained information. Such alteration may be made, for example, when an employee is on leave. The corporation website 12 is connected to the application server 13, and provides an operating platform for processing attendance operations. The application server 13 comprises a plurality of software function modules for maintaining master data, maintaining time and attendance information on employees, managing attendance records, and generating reports. The database 15 stores various information used or generated by implementing the system. The information includes master data on the employees, current attendance records, historical attendance records, request for leave records, official business travel records, work overtime records, etc.

The client computers 10 are connected to the corporation website 12 through a network 11. The network 11 may be an intranet, the Internet, or any other suitable type of communications link. The application server 13 is connected to the database 15 through a connection 14, which is a database connectivity such as an Open Database Connectivity (ODBC) or a Java Database Connectivity (JDBC).

Figure 2:
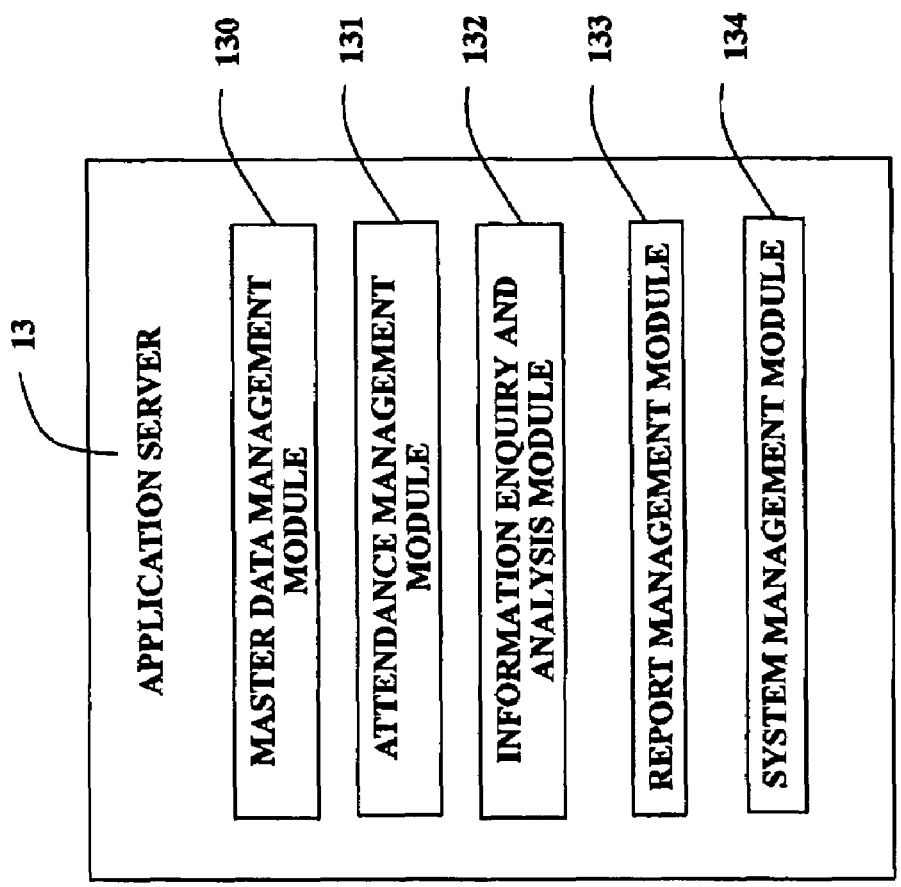
FIG. 2 is a schematic diagram showing main software function modules of an application server of the system of FIG. 1.

FIG. 2 is a schematic diagram of main software function modules of the application server 13. The application server 13 comprises a master data management module 130, an attendance management module 131, an information inquiry and analysis module 132, a report management module 133, and a system management module 134.

The master data management module 130 maintains master data on the employees. Master data on each employee include an employee name, a department, a corresponding supervisor, and attendance requirements for the employee. The attendance requirements specify normal work hours in a workday and a work place for the employee. The attendance management module 131 records an arrival time, a departure time and a work place of each employee, calculates actual work hours according to the arrival time and departure time for each employee, compares the actual work hours to the normal work hours specified in the attendance requirements, and processes abnormal attendance statuses. An abnormal attendance status occurs when actual work hours or a work place of any employee does not match with the attendance requirements specified for the employee. The information inquiry and analysis module 132 is provided for users to search for attendance records related to any of the employees. The report management module 133 is used for generating corresponding attendance reports. The attendance reports include attendance information reports for different employees, and attendance information reports for different departments of the organization. The system management module 134 is used for managing users and system information.

Figure 3:
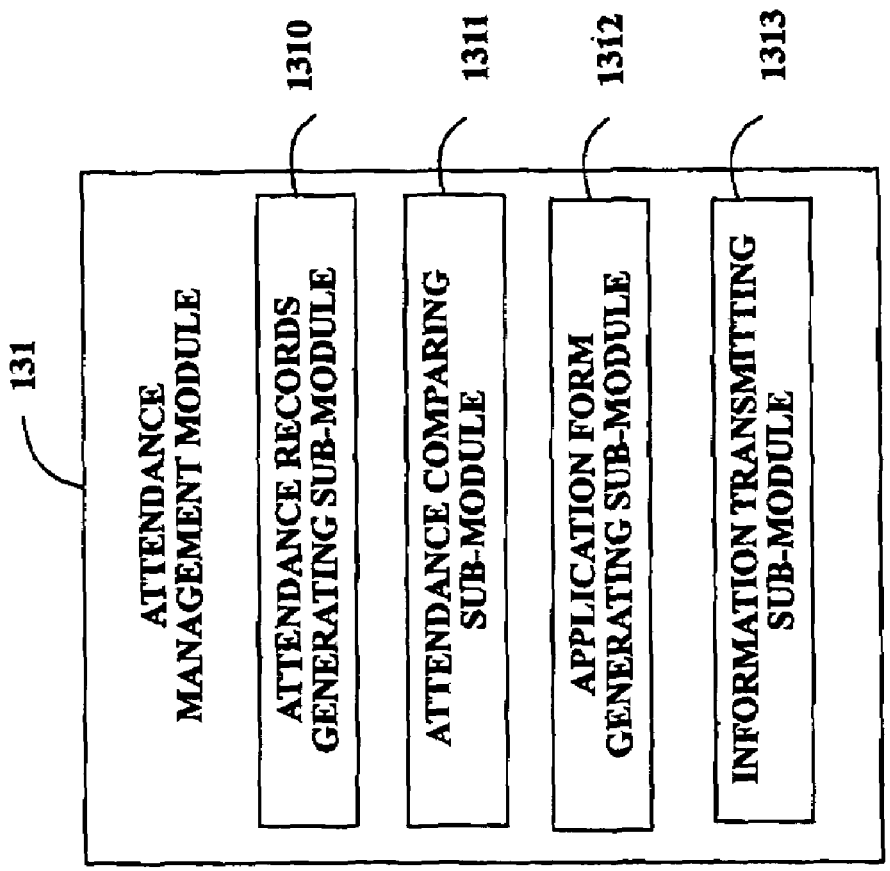
FIG. 3 is a schematic diagram of main function sub-modules of an attendance management module of the application server of the system of FIG. 1.

FIG. 3 is a schematic diagram of main function sub-modules of the attendance management module 131. The attendance management module 131 comprises an attendance records generating sub-module 1310, an attendance comparing sub-module 1311, an application form generating sub-module 1312, and an information transmitting sub-module 1313.

The attendance records generating sub-module 1310 is provided for recording an arrival time and a departure time of each employee, and a work place of the employee, in order to generate a current attendance record for the employee. The attendance comparing sub-module 1311 is provided for comparing the current attendance record to attendance requirements specified for the employee. If the current attendance record does not match with the attendance requirements, an abnormal attendance status occurs. The employee is required to fill out a corresponding application form in order to explain the abnormal attendance. The application form generating sub-module 1312 provides various application forms for use by the employees under different circumstances. The application forms generally include application forms for requesting leave, application forms for traveling on business, and application forms for working overtime. When an abnormal attendance occurs, the information transmitting sub-module 1313 transmits an e-mail to a corresponding employee notifying him/her of the need to fill out a corresponding application form. Subsequently, the information transmitting sub-module 1313 transmits an e-mail enclosing the completed application form to a corresponding supervisor, notifying him/her of the need to verify the completed application form.

Figure 4:
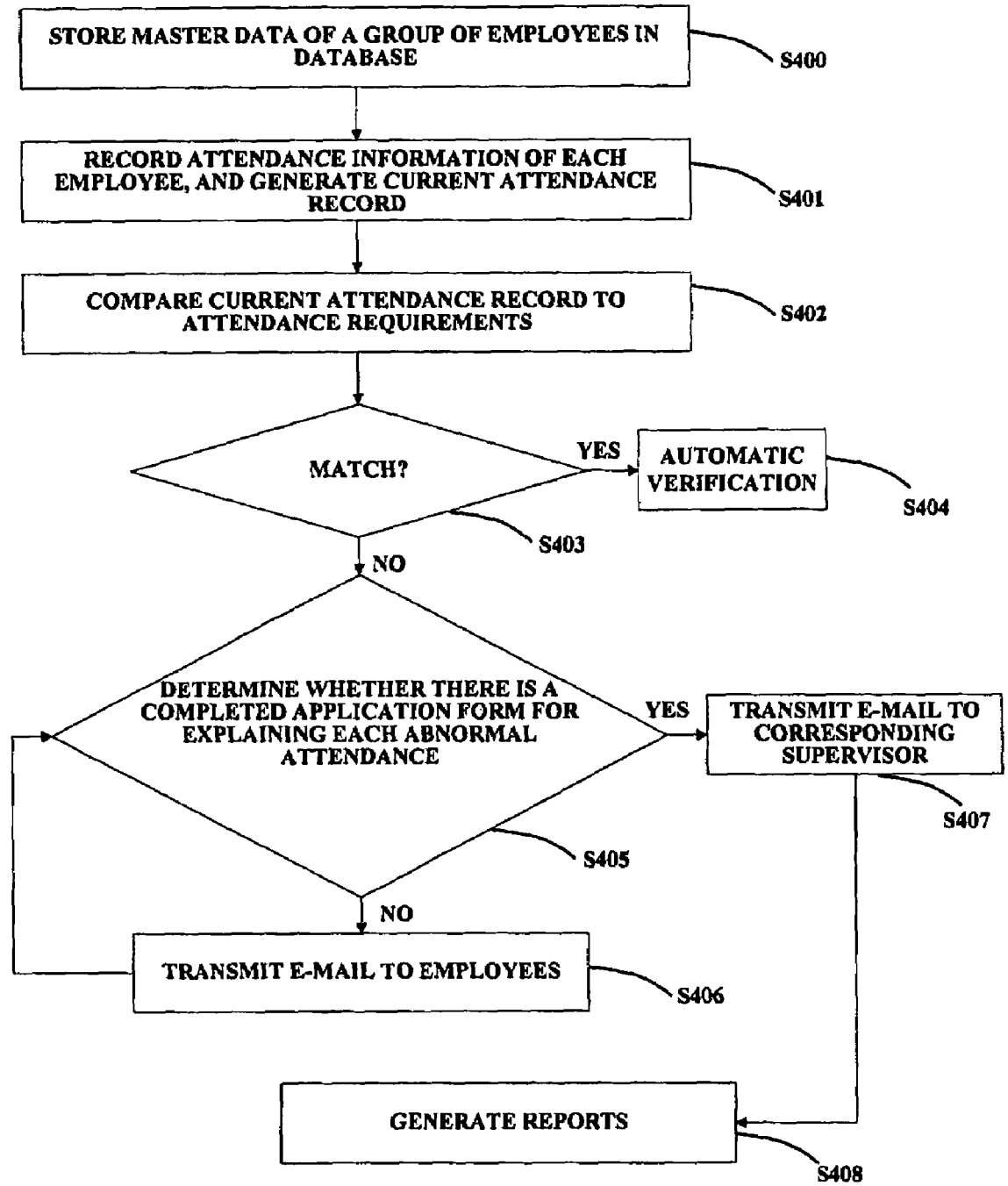
FIG. 4 is a flowchart of a preferred method for dynamically controlling attendance of a group of employees according to the present invention.

FIG. 4 is a flowchart of a preferred method for dynamically controlling attendance of a group of employees according to the present invention. In step S400, the master data management module 130 stores master data on the group of employees in the database 15. In step S401, the attendance records generating sub-module 1310 records an arrival time and a departure time of each employee and one or more work places of the employees, and generates a current attendance record for the employees. In step S402, the attendance comparing sub-module 1311 compares the current attendance record to attendance requirements specified for the employees in the master data. In step S403, the attendance comparing sub-module 1311 determines whether the current attendance record matches with the attendance requirements. If the current attendance record matches with the attendance requirements, in step S404, the application server 13 automatic verifies the current attendance record. If the current attendance record does not match with the attendance requirements for any one or more particular employee, each such employee is required to fill out a corresponding application form in order to explain the abnormal attendance. In step S405, the application server 13 determines whether every such employee has submitted a completed application form. If any such employee has not submitted a completed application form, in step S406, the information transmitting sub-module 1313 transmits an e-mail to each such employee notifying him/her of the need to fill out the application form. Each such employee can submit a completed application form when they receive the notice. If and when every such employee has submitted a completed application form, in step S407, the information transmitting sub-module 1313 transmits an e-mail enclosing the completed application form(s) to a corresponding supervisor, notifying him/her of the need to verify the completed application form(s). In step S408, the report management module 133 generates attendance reports.

Although the present invention has been specifically described on the basis of a preferred embodiment and preferred method, the invention is not to be construed as being limited thereto. Various changes or modifications may be made to said embodiment and method without departing from the scope and spirit of the invention.

What is claimed is:

1. A system for dynamically controlling attendance of a group of employees, the system comprising a corporation website, an application server, a database linking to the application server through a connection, and a plurality of client computers linking to the corporation website through a network, wherein the application server comprises:

a master data management module for maintaining master data on the employees;

an attendance management module for performing operations of recording an arrival time, a departure time and a work place of each employee, calculating actual work hours according to the arrival time and departure time for each employee, comparing the actual work hours to normal work hours specified in attendance requirements of the employee, and processing any abnormal attendance status;

an information inquiry and analysis module for users to search for attendance records related to any or all of the emoloyees; and a report management module for generating corresponding attendance reports;

wherein the attendance management module comprises:

an attendance records generating sub-module for recording the arrival time, the departure time and the work place of each employee, in order to generate a current attendance record for the employee;

an application form generating sub-module for providing various application forms for use by the employees under different circumstances;

an attendance comparing sub-module for comparing the current attendance record to the attendance requirements specified for the employee; and an information transmitting sub-module for transmitting e-mails to corresponding employees and supervisors.

2. The system according to claim 1, wherein the application forms comprise a first application form for requesting leave, a second application form for traveling on business, and a third application form for working overtime.

3. The system according to claim 1, wherein the information transmitting sub-module is used for transmitting an e-mail to a corresponding employee notifing him/her of the need to fill out a corresponding application form if an abnormal attendance occurs.

4. The system according to claim 1, wherein the information transmitting sub-module transmits an e-mail enclosing a completed application form to a corresponding supervisor, notifying him/her of the need to verify the completed application form.

5. A method for dynamically controlling attendance of a group of employees, the method comprising the steps of:

storing master data on the group of employees in a database;

recording an arrival time, a departure time and a work place of each employee, and generating a current attendance record for the employee;

comparing the current attendance record to attendance requirements specified for the employee;

determining whether there is a completed application form for explaining an abnormality if the current attendance record does not match with the attendance requirements;

transmitting an e-mail to a corresponding supervisor notifying him/her of the need to verify the completed application form if there is a completed application form;

transmitting an e-mail to the employee notifying him/her of the need to fill out an application form if there is no completed application form; and generating one or more reports.

6. A method for dynamically controlling attendance of a group of employees, the method comprising: storing master data on the group of employees in a database; generating a current attendance record for the employee; comparing the current attendance record to attendance requirements specified for the employee; determining whether there is a completed application form for explaining an abnormality if the current attendance record does not match with the attendance requirements; notifying the employee of the need to fill out an application form if the current attendance record does not match the attendance requirements and there is no completed application; and notifying a corresponding supervisor of the need to verify the completed application form if there is a completed application.

7. The method according to claim 6, further comprising the step of automatically verifing the current attendance record if the current attendance record matches with the attendance requirements.

8. The method according to claim 6, further comprising the step of generating one or more reports.

9. The method according to claim 6, wherein the master data include an employee name, a department, a corresponding supervisor, and the attendance requirements for the employees.

10. The method according to claim 9, wherein the attendance requirements specify normal work hours in a workday and a work place for the employee.

* * * * *